US008313554B2

(12) United States Patent
De Vries et al.

(10) Patent No.: US 8,313,554 B2
(45) Date of Patent: Nov. 20, 2012

(54) METHOD FOR THE SEPARATION OF MOLTEN ALUMINIUM AND SOLID INCLUSIONS

(75) Inventors: Paul Alexander De Vries, Beverwijk (NL); Huibrecht Adriaan Wouters, Lieden (NL); Marcellus Albertus Hogenboom, Oude Wetering (NL)

(73) Assignee: Aleris Switzerland GmbH, Schaffhausen (CH)

( * ) Notice: Subject to any disclaimer, the term of this patent is extended or adjusted under 35 U.S.C. 154(b) by 805 days.

(21) Appl. No.: 12/304,293

(22) PCT Filed: Jun. 20, 2007

(86) PCT No.: PCT/EP2007/005448
§ 371 (c)(1),
(2), (4) Date: Jul. 7, 2009

(87) PCT Pub. No.: WO2007/147587
PCT Pub. Date: Dec. 27, 2007

(65) Prior Publication Data
US 2009/0301259 A1    Dec. 10, 2009

(30) Foreign Application Priority Data
Jun. 22, 2006   (EP) .................................. 06012843

(51) Int. Cl.
*C22B 21/06* (2006.01)
(52) U.S. Cl. ............................. 75/684; 75/679; 75/683
(58) Field of Classification Search ................ 75/10.67, 75/404, 406, 412, 671, 678, 679, 680, 681, 75/682, 683, 684
See application file for complete search history.

(56) References Cited

U.S. PATENT DOCUMENTS

| | | | |
|---|---|---|---|
| 1,562,090 A | 11/1925 | Hoopes | |
| 1,938,101 A | 12/1933 | Hall | |
| 3,211,547 A | 10/1965 | Jarrett et al. | |
| 3,239,899 A | 3/1966 | Johnson | |
| 3,296,811 A | 1/1967 | Stoller | |
| 3,303,019 A | 2/1967 | Jacobs | |
| 3,308,666 A | 3/1967 | Anderson et al. | |
| 3,671,229 A | 6/1972 | Ferber et al. | |
| 3,839,019 A | 10/1974 | Bruno et al. | |
| 3,840,219 A | 10/1974 | Sheridan et al. | |
| 3,840,364 A | 10/1974 | Flemings et al. | |
| 3,849,119 A * | 11/1974 | Bruno et al. .................... 75/678 |
| 4,043,802 A | 8/1977 | Esdaile et al. | |
| 4,050,683 A | 9/1977 | Langhammer | |
| 4,099,965 A | 7/1978 | Beguin et al. | |
| 4,133,517 A | 1/1979 | Esdaile et al. | |
| 4,222,830 A | 9/1980 | Dawless et al. | |
| 4,239,606 A | 12/1980 | Dawless et al. | |
| 4,243,211 A | 1/1981 | Leroy et al. | |
| 4,246,106 A * | 1/1981 | Dolgov et al. .................. 75/412 |
| 4,273,627 A | 6/1981 | Dawless et al. | |
| 4,305,763 A | 12/1981 | Quist et al. | |
| 4,379,718 A | 4/1983 | Grantham et al. | |
| 4,411,747 A | 10/1983 | Dawless et al. | |
| 4,456,480 A | 6/1984 | Wintenberger | |
| 4,581,062 A | 4/1986 | Boutin | |
| 4,736,314 A | 4/1988 | Riese et al. | |
| 4,744,823 A | 5/1988 | Raymond-Seraille | |
| 4,781,771 A | 11/1988 | Masumoto et al. | |
| 5,057,150 A | 10/1991 | Reeve et al. | |
| 5,160,532 A | 11/1992 | Benz et al. | |
| 5,221,377 A | 6/1993 | Hunt, Jr. et al. | |
| 5,312,498 A | 5/1994 | Anderson | |
| 5,405,427 A * | 4/1995 | Eckert ............................ 75/308 |
| 5,427,602 A | 6/1995 | DeYoung et al. | |
| 5,573,574 A | 11/1996 | Leroy | |
| 5,741,348 A | 4/1998 | Van Der Donk et al. | |
| 5,968,223 A | 10/1999 | Eckert | |
| 6,143,070 A | 11/2000 | Bliss et al. | |
| 6,224,648 B1 | 5/2001 | Verdoes et al. | |
| 6,290,900 B1 | 9/2001 | Hatano et al. | |
| 6,335,085 B1 | 1/2002 | Asano et al. | |
| 6,355,085 B1 * | 3/2002 | Pillin et al. .................... 75/10.67 |
| 6,482,386 B2 | 11/2002 | Atchetee | |
| 6,909,505 B2 | 6/2005 | Lucas et al. | |
| 6,972,110 B2 | 12/2005 | Chakrabarti et al. | |
| 7,419,530 B2 | 9/2008 | De Vries et al. | |
| 7,442,228 B2 | 10/2008 | De Vries | |
| 7,531,023 B2 | 5/2009 | De Vries | |
| 7,537,639 B2 | 5/2009 | De Vries | |
| 7,648,559 B2 | 1/2010 | De Vries et al. | |
| 2004/0261572 A1 | 12/2004 | De Vries | |

(Continued)

FOREIGN PATENT DOCUMENTS

DE    258 283 A1    7/1988

(Continued)

OTHER PUBLICATIONS

Hanumanth et al., "Particle Sedimentation During Processing of Liquid Metal-Matrix Composites", Metallurigical Transaction B., vol. 23B, pp. 753-763 (1992).

(Continued)

*Primary Examiner* — George Wyszomierski
*Assistant Examiner* — Tima M McGuthry Banks
(74) *Attorney, Agent, or Firm* — Novak Druce + Quigg, LLP

(57) ABSTRACT

A method for the separation of a dispersion of molten aluminium and solid inclusions formed from a melt of aluminium containing one or more foreign chemical elements. Molten aluminium surrounding the solid inclusions is at least essentially replaced by a molten salt.

19 Claims, No Drawings

U.S. PATENT DOCUMENTS

| | | |
|---|---|---|
| 2005/0145071 A1 | 7/2005 | Cates |
| 2005/0178239 A1 | 8/2005 | De Vries et al. |
| 2007/0023110 A1 | 2/2007 | De Vries |
| 2009/0308203 A1 | 12/2009 | Wouters et al. |
| 2010/0024602 A1 | 2/2010 | Wouters et al. |

FOREIGN PATENT DOCUMENTS

| | | |
|---|---|---|
| DE | 43 25 793 A1 | 2/1995 |
| EP | 0099948 A1 | 2/1984 |
| EP | 0375308 A1 | 6/1990 |
| EP | 0587274 A1 | 3/1994 |
| EP | 0696646 A2 | 2/1996 |
| EP | 0745693 A1 | 12/1996 |
| EP | 0829552 A1 | 3/1998 |
| EP | 1288319 A1 | 3/2003 |
| EP | 1380659 A | 1/2004 |
| FR | 1594154 A | 6/1970 |
| GB | 615590 A | 1/1949 |
| GB | 885503 A | 12/1961 |
| GB | 974829 A | 11/1964 |
| GB | 1352567 A | 5/1974 |
| GB | 2154315 A | 9/1985 |
| JP | 52135797 | 11/1977 |
| JP | 55050442 | 4/1980 |
| JP | 57152435 | 9/1982 |
| JP | 58104132 | 6/1983 |
| JP | 59028538 | 2/1984 |
| JP | 59205424 | 11/1984 |
| JP | 60234930 | 11/1985 |
| JP | 7070666 | 3/1995 |
| RU | 2105084 | 2/1998 |
| RU | 2112065 | 5/1998 |
| SU | 1589173 | 8/1990 |
| WO | 98/27240 A1 | 6/1998 |
| WO | 02052053 | 7/2002 |
| WO | 2004005558 A1 | 1/2004 |
| WO | 2004005559 | 1/2004 |
| WO | WO 2005/049875 A1 * | 6/2005 |
| WO | 2005095658 | 10/2005 |
| WO | WO 2005/095658 A1 * | 10/2005 |

OTHER PUBLICATIONS

Proceedings of 4th Int. Symposium on Recycling of Metals & Engineered Materials, TMS 2000, Kahveci et al., "Refining of a 5XXX Series Aluminum Alloy Scrap by Alcoa Fractional Crystallization Process," p. 979-91(2000).

L.C. Bartel et al., An Electrical Resistivity Measurement in Molten Basalt During the 1983 Kilauea Eruption, Bull. Volcanol., vol. 46.3, pp. 271-276 (1983).

Isenberg-O'Loughlin, Jo, "Taming the Thunder," Metal Producing. vol. 33. pp. 21-23. Sep. 1994.

U.S. Appl. No. 11/492,226—Office Action mailed Sep. 9, 2008, 11 pages.

U.S. Appl. No. 10/598,731—Notice of Allowance mailed Jan. 23, 2009, 7 pages.

Perry's Chemical Engineers' Handbook, Seventh Edition, McGraw-Hill, 1997, pp. 18-5 to 18-13.

U.S. Appl. No. 12/304,311—Notice of Allowance mailed Aug. 9, 2010.

U.S. Appl. No. 10/488,042—Notice of Allowance in mailed Jun. 2, 2008.

U.S. Appl. No. 10/488,042—Notice of Allowance mailed Mar. 18, 2008.

U.S. Appl. No. 10/488,042—Office action mailed May 11, 2007, 9 pages.

U.S. Appl. No. 10/488,042—Office action mailed Oct. 16, 2007, 5 pages.

U.S. Appl. No. 10/491,278—Office action mailed Dec. 3, 2007, 9 pages.

U.S. Appl. No. 10/491,278—Office action mailed Jun. 26, 2007, 9 pages.

U.S. Appl. No. 10/516,888—Notice of Allowance mailed Jan. 10, 2008.

U.S. Appl. No. 10/516,888—Notice of Allowance mailed Jun. 2, 2008.

U.S. Appl. No. 10/516,888—Notice of Allowance mailed Oct. 7, 2009.

U.S. Appl. No. 10/516,888—Office action mailed Jan. 13, 2009, 6 pages.

U.S. Appl. No. 10/516,888—Office action mailed Jul. 18, 2007, 11 pages.

U.S. Appl. No. 10/516,888—Office action mailed Sep. 3, 2008, 8 pages.

U.S. Appl. No. 10/516,888—Office action mailed Apr. 20, 2009.

U.S. Appl. No. 10/516,889—Office action mailed Aug. 30, 2007, 14 pages.

U.S. Appl. No. 10/516,889—Office action mailed Jan. 31, 2008.

U.S. Appl. No. 10/516,889—Office action mailed May 30, 2008, 6 pages.

U.S. Appl. No. 10/516,889—Notice of Allowance mailed Jul. 10, 2008.

U.S. Appl. No. 10/577,354—Office Action mailed Nov. 18, 2008, 9 pages.

U.S. Appl. No. 10/577,354—Notice of Allowance mailed Mar. 5, 2009, 7 pages.

Davis, J.R. (editor), ASM Specialty Handbook, Aluminum and Aluminum Alloys, pp. 207-216 (1993).

U.S. Appl. No. 10/306,023—Office action mailed Nov. 3, 2010, 7 pages.

U.S. Appl. No. 12/304,311—Notice of Allowance mailed Oct. 20, 2010.

* cited by examiner

METHOD FOR THE SEPARATION OF MOLTEN ALUMINIUM AND SOLID INCLUSIONS

This application is a §371 National Stage Application of International Application No. PCT/EP2007/005448, filed on 20 Jun. 2007, claiming the priority of European Patent Application No. 06012843.6 filed on 22 Jun. 2006.

BACKGROUND OF THE INVENTION

The invention relates to a method for the separation of molten aluminum and solid inclusions formed from a melt of aluminum containing one or more foreign chemical elements.

During the production of aluminum one of the problems is that, depending on its subsequent use, too high a concentration of foreign chemical elements is present, both when the aluminum is produced from aluminum ore and when recycled aluminum is used. For instance aluminum scrap can contain too much Fe, Mn, Si or Mg for use for commercial purposes without mixing it with primary aluminum containing little of the foreign element. These foreign elements can be removed by cooling molten aluminum, resulting in the formation of inter-metallic compounds or crystals containing only one foreign element as solid inclusions when the molten aluminum containing the foreign elements is hypereutectic. If the molten aluminum containing the foreign elements is hypoeutectic, first foreign elements are added to make the melt hypereutectic.

When more than one foreign chemical element is present and the molten aluminum is cooled, first one inter-metallic compound or crystals containing only one foreign element is/are formed, and after that a second or even third or further inter-metallic compound or crystals will be formed.

These inter-metallic compounds or crystals are present in the molten aluminum and have to be removed to purify the molten aluminum. For the removal of the inter-metallic compounds or crystals several techniques are known, such as gravity sedimentation, flotation, filtration, centrifugation, electromagnetic sedimentation, and ultrasonic treatment. These methods offer an effective way to remove both small and large particles.

An important drawback of the known removal techniques is that quite a lot of molten aluminum is lost as interstitial aluminum for instance between the inter-metallics in the filter cake, when large quantities of inclusions are present, which results in a severe economic loss. Large quantities of inclusions are for instance present when the inclusions are formed on purpose, for instance when inter-metallics are formed in hypereutectic aluminum melts.

BRIEF SUMMARY OF THE INVENTION

It is an object of the present invention to provide a method for the separation of a dispersion of molten aluminum and solid inclusions, formed from a melt of aluminum containing one or more foreign chemical elements, with which the solid inclusions can be separated from the molten aluminum such that little or no molten aluminum is lost.

It is another object of the present invention to provide a method for the separation of a dispersion of molten aluminum and solid inclusions, formed from a melt of aluminum containing one or more foreign chemical elements, which is more efficient than the known methods.

One or more of these objects are reached by the method according to the present invention, which method for the separation of a dispersion of molten aluminum and solid inclusions formed from a melt of aluminum containing one or more foreign chemical elements is characterised in that molten aluminum surrounding the solid inclusions is at least essentially replaced by a molten salt.

This means that the solid inclusions are now incorporated in the molten salt, and are no longer part of the molten aluminum, resulting in a refinement of the aluminum. It will be apparent that a thin layer of molten aluminum could still be present on the solid inclusions. The amount of molten aluminum adhering to the solid inclusions is preferably present to a maximum of 20% in weight of the solid inclusions, more preferably a maximum of 10%, and still more preferably a maximum of 5%. The use of molten salt has the advantage that the inclusions can be easily removed from the salt, and that salt is cheap as compared to aluminum, so a loss of salt is not a heavy economic loss, while on the other hand a substantial part of the salt can be reused.

Preferably, the solid inclusions are inter-metallics or crystals containing only one foreign element formed from one or more foreign elements in the molten aluminum. The method according to the invention is especially suitable for the removal of inter-metallics and foreign crystals from aluminum. However, the method according to the invention can also be used when the solid inclusions are aluminum crystals formed in the molten aluminum. When the invention is used for aluminum crystals, the purpose of the invention is not to reduce the loss of molten aluminum, but to provide a more efficient separation of the aluminum crystals from the molten aluminum containing foreign elements, such that the aluminum when re-melting the crystals is as refined as possible. At the same time, the method could be used for the removal of oxide particles, ceramic particles and/or other inclusions that are present in the molten aluminum due to the melting or cooling process or as a consequence of preceding processes.

DETAILED DESCRIPTION OF THE INVENTION

According to a first preferred embodiment of the method according to the invention, the molten salt and the dispersion of molten aluminum with solid inclusions are subjected to a force other than the gravitation force, to transport at least part of the solid inclusions from the molten aluminum into the molten salt. It should be kept in mind that the gravitational force is usually not strong enough to replace the molten aluminum by the molten salt. When the inter-metallics (or crystals containing only one foreign element) have a specific density that is higher than the specific density of aluminum, as is the case for most foreign elements, and a layer of the dispersion of molten aluminum and inter-metallics is present above a layer of molten salt, the inter-metallics will sink to the bottom of the layer of molten aluminum, but they will not sink into the molten salt due to the surface tension of the molten aluminum. The same holds, mutatis mutandis, when the inter-metallics and the molten salt are lighter than the molten aluminum and the inter-metallics rise in the molten aluminum.

According to the invention a force other than the gravitational force is provided, and due to this force, the solid inclusions will be able to break the surface tension of the molten aluminum and thus be transported from the molten aluminum into the molten salt. This force can be additional to the gravitation force, but that needs not be so: the force can be strong enough in itself, without help from the gravitation force, or even acting against the gravitation force.

According to a preferred way to exert the additional force, the molten salt and the dispersion of molten aluminum with solid inclusions are subjected to a mixing force in a first compartment and this mixture of molten aluminum, solid inclusions and molten salt is transported to a second compartment in which this mixture can settle in a molten aluminum phase and a molten salt phase. Here the mixing force can for instance be exerted by pouring the molten salt and the dispersion of molten aluminum and solid inclusions into the first compartment with a certain velocity. Due to the turbulence at least part of the solid inclusions will break the surface tension of the molten aluminum and be at least essentially surrounded by the molten salt. In the second compartment the mixed liquid containing the solid inclusions can settle in a molten aluminum phase and a molten salt phase, in which preferably the molten salt phase contains most or all the solid inclusions, and both phases can be tapped off separately from the second compartment. In this way the separation can be effected continuously. To achieve a better mixing force, a stirring apparatus can be present to forcibly mix the liquid in the first compartment. Preferably, one or more coalescence plates are present in the second compartment to aid in the separation of the molten aluminum phase and the molten salt phase.

Another possible way is to subject the molten salt and the dispersion of molten aluminum with solid inclusions to a mixing force and thereafter to leave the mixture to settle in a molten aluminum phase and a molten salt phase. This method can be used to provide a batch separation of the dispersion of the molten aluminum and the solid inclusions. Here too a stirring apparatus can be present during the mixing.

Another preferred way to exert an additional force is providing a layer of molten salt in contact with a layer of the dispersion of molten aluminum with solid inclusions, wherein the layer of molten salt and/or the layer of the dispersion of molten aluminum with solid inclusions is subjected to a stirring force. Due to the stirring of one or both of the layers, the contact surface between the molten aluminum layer and the molten salt layer will be ruptured and droplets of the molten aluminum with the inclusions will get into the molten salt, and droplets of the molten salt will get into the molten aluminum with inclusions. Due to the continued stirring some of the droplets of aluminum will be reduced until only the inclusion(s) that were present in the droplet are left, which are thus part of the layer of molten salt.

For the above preferred ways to exert the additional force, preferably the salt used has a specific density that is higher than the specific density of the aluminum. This is because most inter-metallics also have a specific density that is higher than the specific density of aluminum. When both the salt and the solid inclusions have a specific density that is higher than the density of aluminum, the gravitational force will add to the replacement of molten aluminum by molten salt during the separation according to the invention as described above. For some foreign elements, however, the inter-metallics have a specific density that is lower than the density of aluminum, and in such a case the salt used should have a specific density that is lower than the density of aluminum.

According to another preferred way to exert an additional force, the molten salt and the dispersion of molten aluminum with solid inclusions are subjected to a centrifugal force. Due to the centrifugal force the solid inclusions such as the inter-metallics which have a higher specific density than the molten aluminum, are subjected to a higher force than the molten aluminum because the centrifugal force is directly proportional to mass. The force on the solid inclusions will now be high enough to break the surface tension of the molten aluminum if the centrifugal force is high enough. The solid inclusions having a higher specific density than the molten aluminum will thus be transported from the molten aluminum into molten salt having a higher specific density than the molten aluminum. The same holds when the solid inclusions and the molten salt have a lower specific density than the molten aluminum.

According to still another preferred way the molten salt and the dispersion of molten aluminum with solid inclusions are subjected to an electromagnetic force. The electromagnetic force only acts on materials which have an electric conductivity. Since aluminum has a very high electric conductivity, whereas molten salt has a low electric conductivity and inter-metallics have an electric conductivity that is virtually zero, when the molten salt and the dispersion of molten aluminum with solid inclusions such as inter-metallics are subjected to an electromagnetic force, the molten aluminum is forced in one direction and the molten salt is forced in the other direction, whereas at the same time the solid inclusions will be subjected to a strong force from the molten aluminum into the molten salt. The dispersion of molten aluminum with solid inclusions is thus separated. When the electromagnetic force is used to separate the solid inclusions from the molten aluminum, the density of the solid inclusions and the salt is not important as such.

According to yet another preferred way to exert an additional force, the interface between the molten salt and the molten aluminum is perturbed, for instance by bubbling with a gas, or by flotation when the molten salt has a specific density that is lower than the specific density of molten aluminum. The perturbing of the interface results in the local disruption of the interface between the molten aluminum and the molten salt and thus in the reduction of the surface tension between the molten salt and molten aluminum. In this way the solid inclusions can be transported from the molten aluminum into the molten salt. The interface can for instance be perturbed by bubbling with gas, which is a known technique in steel making, or by flotation, which also is a known technique.

According to a second preferred embodiment of the method according to the invention, the solid inclusions are first concentrated, such as by filtering from or by settling in the dispersion of molten aluminum with solid inclusions to form a cake containing solid inclusions and molten aluminum, and after the concentration the molten salt is used to wash molten aluminum out of the cake. The known filtration techniques have the disadvantage that in between the filtered solid inclusions quite a lot of molten aluminum is still present. Without any further separation methods, this aluminum would be lost. Using the method according to the invention, a large part of the molten aluminum in the cake is replaced by molten salt, and the molten aluminum from the cake is removed with the molten salt used for the washing and can be easily separated thereof, for instance by settling.

When the above embodiment of the method according to the invention is used for the separation of the molten aluminum and the solid inclusions, it is possible that the concentration and the washing are performed alternately. In this way a new cake is formed and washed each time, and the concentrated inclusions are removed each time. This alternation can be used as a batch process, but also as a continuous alternation.

It is also possible that the concentration and washing are performed as a continuous process. For this method, a rotating filter such as a rotary drum filter can be used, from which the filtered and washed inclusions can be removed for instance by scraping it off the filter.

According to one preferred method, when washing the filter cake an underpressure is used to draw the molten salt through the filter cake. The underpressure provides enough driving force for essentially replacing the molten aluminum in the filter cake by the molten salt.

According to another preferred method, the molten salt is pressed through the filter cake using an overpressure. In this way the overpressure provides the driving force for essentially replacing the molten aluminum in the filter cake by the molten salt.

It is moreover possible that a wash column is used to filter the solid inclusions from the dispersion of molten aluminum and solid inclusions to form the filter cake, wherein the molten salt is used to wash molten aluminum countercurrently out of the filter cake. It is known to use a wash column to refine aluminum, as described in European patent application EP 0.954.616, where the wash column is used for the fractional crystallisation of aluminum and the purified crystals are washed using molten purified aluminum.

The invention claimed is:

1. Method for the separation of a dispersion of molten aluminium with solid inclusions formed from a melt of aluminium containing one or more foreign chemical elements, wherein molten aluminium surrounding the solid inclusions is at least essentially replaced by a molten salt, wherein the molten salt and the dispersion of molten aluminium with solid inclusions are subjected to a mixing force in a first compartment and this mixture of molten aluminium, solid inclusions, and molten salt is transported to a second compartment in which this mixture settles into a molten aluminium phase and a molten salt phase, and
   wherein the solid inclusions are first concentrated to form a cake containing solid inclusions and molten aluminium, and wherein after the concentration the molten salt is used to wash molten aluminium out of the cake.

2. Method according to claim 1, wherein the solid inclusions are inter-metallics or crystals containing a foreign element formed from one or more foreign elements in the molten aluminium.

3. Method according to claim 1, wherein the solid inclusions are aluminium crystals formed in the molten aluminium.

4. Method according to claim 1, wherein the molten salt and the dispersion of molten aluminium with solid inclusions are subjected to a force other than gravitational force, to transport at least part of the solid inclusions from the molten aluminium into the molten salt.

5. Method according to claim 4, wherein the molten salt and the dispersion of molten aluminium with solid inclusions are subjected to a mixing force and thereafter the mixture settles into a molten aluminium phase and a molten salt phase.

6. Method according to claim 4, wherein a layer of molten salt is in contact with a layer of the dispersion of molten aluminium with solid inclusions, and wherein
   the layer of molten salt and/or the layer of the dispersion of molten aluminium with solid inclusions is subjected to a stirring force.

7. Method according to claim 4, wherein the molten salt has a specific density that is higher than the specific density of the aluminium.

8. Method according to claim 4, wherein the molten salt and the dispersion of molten aluminium with solid inclusions are subjected to a centrifugal force.

9. Method according to claim 4, wherein the molten salt and the dispersion of molten aluminium with solid inclusions are subjected to an electromagnetic force.

10. Method according to claim 4, wherein an interface between the molten salt and the molten aluminum is perturbed when the molten salt has a specific density that is lower than the specific density of molten aluminum.

11. Method according to claim 10, wherein the molten aluminum is perturbed by bubbling with a gas.

12. Method according to claim 10, wherein the molten aluminum is perturbed by flotation.

13. Method according to claim 1, wherein one or more coalescence plates are present in the second compartment to aid in the separation of the molten aluminium phase and the molten salt phase.

14. Method according to claim 1, wherein the concentration and the washing are performed alternately.

15. Method according to claim 1, wherein the concentration and washing are performed as a continuous process.

16. Method according to claim 1, wherein an underpressure is used to draw the molten salt through the cake.

17. Method according to claim 1, wherein the molten salt is pressed through the cake using an overpressure.

18. Method according to claim 1, wherein a wash column is used to filter the solid inclusions from the dispersion of molten aluminium and solid inclusions to form the filter cake, and wherein the molten salt is used to wash molten aluminium countercurrently out of the filter cake.

19. Method according to claim 1, wherein the solid inclusions are first concentrated by filtering from or by settling in the dispersion of molten aluminium with solid inclusions, to form a cake containing solid inclusions and molten aluminium, and wherein after the concentration the molten salt is used to wash molten aluminium out of the cake.

* * * * *